(12) United States Patent
Tomiyama et al.

(10) Patent No.: US 6,940,690 B2
(45) Date of Patent: Sep. 6, 2005

(54) MAGNETIC HEAD WITH HIGH RELIABILITY OF THE DATA PROTECTION, MAGNETIC DISK APPARATUS INCLUDING THE MAGNETIC HEAD AND THE METHOD OF RECORDING INFORMATION ON THE MAGNETIC DISK APPARATUS WITHOUT MISERASING THE PREVIOUSLY RECORDED DATA

(75) Inventors: Futoshi Tomiyama, Hachioji (JP); Takehiko Hamaguchi, Fuchu (JP); Miki Hara, Kodaira (JP); Fumiko Akagi, Fuchu (JP); Yasutaka Nishida, Kodaira (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 131 days.

(21) Appl. No.: 09/805,806

(22) Filed: Mar. 13, 2001

(65) Prior Publication Data

US 2001/0030832 A1 Oct. 18, 2001

(30) Foreign Application Priority Data

Mar. 14, 2000 (JP) .................................... 2000-076333

(51) Int. Cl.[7] .............................................. G11B 5/147
(52) U.S. Cl. ................................................ 360/126
(58) Field of Search .................................. 360/126, 125, 360/110

(56) References Cited

U.S. PATENT DOCUMENTS

| 4,970,616 | A | * | 11/1990 | Ramaswamy | ............... 360/122 |
| 5,680,283 | A | | 10/1997 | Tanaka et al. | ............... 360/125 |
| 5,854,727 | A | | 12/1998 | Tanaka et al. | ............... 360/125 |
| 5,920,449 | A | * | 7/1999 | Tagawa | ....................... 360/122 |
| 5,995,341 | A | | 11/1999 | Tanaka et al. | ............... 360/125 |
| 6,278,591 | B1 | * | 8/2001 | Chang et al. | ............... 360/317 |
| 6,504,675 | B1 | * | 1/2003 | Shukh et al. | ............... 360/125 |
| 6,631,054 | B2 | | 10/2003 | Miyazaki et al. | ........... 360/317 |
| 2002/0063992 | A1 | * | 5/2002 | Kim et al. | ................... 360/125 |

OTHER PUBLICATIONS

Ohki, Satoshi, et al., "Read/Write Characteristics Of Perpendicular Magnetic Recording Media With ID/MR Composite Head", Journal of Magnetic Society of Japan, vol. 19, No. S2, 1995,* pp. 122–125.

Acharya, B.R., et al., "Activation Volume and Correlation to Media Noise In High–Density Longitudinal Recording Media", IEEE Transactions on Magnetics, vol. 35, No. 5, Sep. 1999, pp. 2652–2654.

Sato, Kenji, et al., "Rigid Disk Medium for 20 Gb/in$^2$ Recording Demonstration", IEEE Transactions on Magnetics, vol. 35, No. 5, Sep. 1999, pp. 2655–2657.

* cited by examiner

*Primary Examiner*—Julie Anne Watko
(74) *Attorney, Agent, or Firm*—Kenyon & Kenyon

(57) ABSTRACT

There are provided a magnetic head and a magnetic disk apparatus wherein an upper magnetic pole is so shaped that, at a position where skew angle is maximum, the maximum of its projected length in the radial direction of a magnetic disk is not more than the track pitch of the magnetic disk, whereby acceleration of thermal relaxation of information recorded on adjacent tracks is obviated even in an area where the skew angle is large.

14 Claims, 18 Drawing Sheets

MAGNETIC HEAD WITH HIGH RELIABILITY OF THE DATA PROTECTION, MAGNETIC DISK APPARATUS INCLUDING THE MAGNETIC HEAD AND THE METHOD OF RECORDING INFORMATION ON THE MAGNETIC DISK APPARATUS WITHOUT MISERASING THE PREVIOUSLY RECORDED DATA

BACKGROUND OF THE INVENTION

1. Field of the Invention

The present invention relates to magnetic recording apparatuses, particularly magnetic disk apparatuses and magnetic heads.

2. Description of the Related Prior Art

Magnetic disk apparatuses are classified into a longitudinal magnetic recording system and a perpendicular magnetic recording system, according to the direction of magnetization of a magnetic film. The perpendicular magnetic recording system can easily realize higher recording density than the longitudinal magnetic recording system, and are expected to be put to practical use in the future. An example of such magnetic heads is seen, for example, in the Journal of Magnetic Society of Japan, Vol. 19, Supplement No. S2, pp. 122–125. Further, time dependency of recorded magnetization in such magnetic recording films and effects of external magnetic field on the characteristics are described in, for example, IEEE Transaction on Magnetics Vol. 35, NO. 5, pp. 2652 (1999) "Activation Volume and Correlation of Media Noise In High-Density Longitudinal Recording Media" or IEEE Transaction on Magnetics Vol. 35, No. 5, pp. 2655 (1999) "Rigid Disk Medium for 20 Gb/in$^2$ Recording Demonstration".

In both perpendicular magnetic recording and longitudinal magnetic recording systems mentioned above, magnetic heads having the same basic structures are used. A representative example of them will be described below referring to the part pertaining to the present invention.

A general view of a rotary actuator with a magnetic head mounted thereon is shown in FIG. 1, and an enlarged view of the magnetic head 1 is shown in FIG. 2. FIG. 2 is a plan view as seen from above of the magnetic head 1. For positioning of the magnetic head 1 in a magnetic disk apparatus, the rotary actuator 2 is used. The angle formed by the rotating direction (circumferential direction) 4 of the magnetic disk 3 and the thickness direction 91 of magnetic pole is defined as skew angle S. In the magnetic disk apparatus having the rotary actuator 2, the skew angle varies according to the head position in the radial direction. Ordinarily, the skew angle S varies in the range of about 20 degrees, according to the radial head position.

As shown in FIG. 2, the magnetic head 1 comprises a first magnetic pole 15, a recording magnetic pole 8 as a second magnetic pole, and a reproducing head portion 6. The example shown in the figure is an example of ring head. The recording magnetic pole 8 has a film thickness 9 of the magnetic pole and a write track width 7. In the case of a recording and reproducing head such as this example, a reproducing head 6 is disposed in stack with the recording head. Layout of a signal processing system and the like will be described later. In the following figures, the rotating direction (circumferential direction) of the magnetic disk is denoted by symbol 4, and the skew angle is denoted by symbol S.

Attendant on the increase in the density of tracks in magnetic storage devices, the track width of magnetic heads has been made smaller and smaller. As the track width 7 of the recording head is reduced, it becomes difficult for a magnetic flux generated in the head to pass through the recording magnetic pole. Therefore, the recording magnetic pole of the head tends to be saturated easily, and leakage flux to the recording medium is reduced. Accordingly, in the case of recording information on a recording medium by use of a recording head having a small track width, it is required to enlarge the magnetic pole thickness 8 of the recording head or to enhance the saturation flux density of the magnetic pole material for the recording head, in order to generate a sufficient magnetic field from the recording magnetic pole.

SUMMARY OF THE INVENTION

The present invention provides a magnetic disk apparatus capable of securing a sufficiently stable recorded state even in magnetic recording with high record density. More particularly, the present invention solves the following difficulties. In the magnetic disk apparatus, at the time of recording information in an area where the above-mentioned skew angle is large, there is generated a condition: when the information is recorded to the target track, the magnetic field from a writing pole is applied to the adjacent tracks. By this condition, thermal decay of the recorded information on the medium at the tracks is accelerated. Over-writing the same track repeatedly results in further acceleration of the thermal decay of the recorded information. The present invention provides a magnetic head and a magnetic disk apparatus in which thermal relaxation of information recorded in adjacent tracks is not accelerated even in a region where the skew angle is large.

Furthermore, the present invention proposes an information recording system such that thermal decay is not easily accelerated.

According to an aspect of the present invention, there is provided a magnetic disk apparatus comprising at least a magnetic head for recording, a rotated magnetic disk, and a means for positioning the recording magnetic head relative to the rotated magnetic disk, wherein the recording magnetic head comprises a first magnetic pole disposed on the upstream side and a second magnetic pole disposed on the downstream side with respect to the rotating direction of the magnetic disk, the first and second magnetic poles have faced portions, and the second magnetic pole is so shaped that the length of projection of the second magnetic pole onto the surface of the magnetic disk measured along the radial direction of the magnetic disk is not more than the track pitch of the magnetic disk.

According to another aspect of the invention, there is provided a magnetic disk apparatus comprising at least a magnetic head for recording, a rotated magnetic disk, and a means for positioning the recording magnetic head relative to the rotated magnetic disk, wherein the recording magnetic head comprises a first magnetic pole disposed on the upstream side, and a second magnetic pole disposed on the downstream side with respect to the rotating direction of the magnetic head, the first and second magnetic poles are faced to each other, a write gap is formed between the faced sides of the first and second magnetic poles, and the shape of the second magnetic pole has a third side between a first side intersecting the write gap and one of second sides faced to the write gap.

The third side is provided on the side of the second magnetic pole nearer to the write gap in one mode, and is provided on the side of the second magnetic pole farther from the write gap in another mode.

Furthermore, the magnetic pole is so shaped that, at a radial position where the angle formed between the radial direction of the recording medium and the track width direction of the magnetic pole is maximum, the length of the projection of the magnetic pole onto the surface of the magnetic disk measured along the radial direction of the magnetic disk is not more than the track pitch of the magnetic disk.

According to a further aspect of the invention, there is provided a magnetic disk apparatus comprising at least a magnetic head for recording, a rotated magnetic recording medium, and a means for positioning the recording magnetic head relative to the rotated magnetic disk, wherein the recording magnetic head comprises a first magnetic pole disposed on the upstream side, and a second magnetic pole disposed on the downstream side with respect to the rotating direction of the magnetic disk, and a coil between the first and second magnetic poles, the first and second magnetic poles are faced to each other, a write gap is formed between the faced sides of the first and second magnetic poles, and the shape of the second magnetic pole comprises a pair of first sides intersecting the write gap, a pair of second sides substantially faced to the write gap, and a third side disposed between one of the first sides and one of the pair of second sides substantially faced to the write gap.

The third side is disposed on the side of the second magnetic pole nearer to the write gap in one mode, and is disposed on the side of the second magnetic pole farther from the write gap in another mode.

Furthermore, the second magnetic pole is so shaped that, at a position where the skew angle is maximum, the length of the projection of the second magnetic pole onto the surface of the magnetic disk measured along the radial direction of the magnetic disk is not more than the track pitch of the magnetic disk.

As has been mentioned above, magnetic disk apparatuses are classified into a longitudinal magnetic recording system and a perpendicular magnetic recording system, and the present invention can basically be applied to both systems. This point is the same in the modes or embodiments of the present invention illustrated below.

Besides, magnetic heads are classified into single-pole heads, ring heads and the like, and the present invention can be applied to both types of magnetic heads. This point is also the same in the modes or embodiments of the present invention illustrated below.

According to a still further aspect of the present invention, there is provided a magnetic disk apparatus comprising at least a magnetic head for recording, a rotated magnetic recording medium, and a means for positioning the recording magnetic head relative to the rotated magnetic recording medium, wherein the recording magnetic head comprises a magnetic pole and a coil, and, at a position where the skew angle S is maximum, the sum of $P \times \sin(S)$ and $W \times \cos(S)$ (where W is the width of the magnetic pole, and P is the pole thickness of the magnetic pole) is not more than the track pitch of the magnetic disk.

According to a still further aspect of the present invention, there is provided a magnetic disk apparatus comprising at least a magnetic head for recording, a rotated magnetic recording medium, and a means for positioning the recording magnetic head relative to the rotated magnetic recording medium, wherein the recording magnetic head comprises a first magnetic pole disposed on the upstream side, and a second magnetic pole disposed on the downstream side with respect to the rotating direction of the magnetic recording medium, the first and second magnetic poles have faced portions, and the second magnetic pole is so shaped that, at a position where the skew angle S is maximum, the sum of $P \times \sin(S)$ and $W \times \cos(S)$ (where W is the width of the second magnetic pole, and P is the pole thickness of the second magnetic pole) is not more than the track pitch of the magnetic recording medium.

As these two modes of the invention of magnetic head as mentioned above, the following particular examples may be given. In the case of a ring type magnetic head, there may be used a method of adjusting the pole thickness of the second magnetic pole, and a method of shaping the second magnetic pole to reduce the projected length as compared with the case of the conventional magnetic pole thickness. As for the shaping of the second magnetic pole, there may be used a method of shaping a corner portion of the second magnetic pole nearer to the write gap, and a method of shaping a corner portion of the second magnetic pole farther from the write gap.

Now, representative forms of a magnetic head according to the invention will be enumerated.

A first form is a magnetic head comprising a first magnetic pole, a second magnetic pole faced to the first magnetic pole, and a coil, wherein a write gap is formed between faced sides of the first and second magnetic poles, and the second magnetic pole has a third side between a first side intersecting the write gap and one of a pair of second sides substantially faced to the write gap.

A second form is a magnetic head comprising a first magnetic pole, a second magnetic pole faced to the first magnetic pole, and a coil, wherein a write gap is formed between faced sides of the first and second magnetic poles, and the shape of the second magnetic pole comprises a pair of first sides intersecting the write gap, and a pair of second sides faced to the write gap, and further comprises a third side between one of the first sides and one of the pair of second sides faced to the write gap.

The third side is provided on the side of the second magnetic pole nearer to the write gap in one mode, and is provided on the side of the second magnetic pole farther from the write gap. Of these modes, the former mode in which the third side is provided on the side nearer to the write gap is more useful in the case of a perpendicular magnetic recording system. The latter mode in which the third side is provided on the side farther from the write gap is more useful in the case of a longitudinal magnetic recording system. The difference between the two modes comes from the position of a recording point of magnetic inversion in the two systems.

Ordinarily, the shape of the first and second magnetic pole is basically a rectangle, and tetrangles are often used. Naturally, in view of machining accuracy, a trapezoid and somewhat irregular tetrangles or shapes with minute modifications may be used; in the present specification, the geometrical shapes including these various modified shapes will be described as rectangle. In addition, the second side substantially faced to the write gap includes a side farther from the write gap and a side nearer to the write gap, and the present invention can be embodied using any one of the two sides.

By use of a magnetic head having such a shape, the magnetic disk apparatus pertaining to the present application can be so constituted that, at a radial position where the skew angle is maximum, the length of the projection of the second magnetic pole onto the surface of the magnetic disk measured along the radial direction of the magnetic disk is not more than the track pitch of the magnetic disk.

As the mode of the present invention, the following mode can also be adopted, which are excellent in the characteristics of thermal decay as compared with the magnetic disk apparatuses according to the prior art.

According to a primary point of the mode of the present invention, there is provided a magnetic disk apparatus comprising at least a magnetic head for recording, a rotated magnetic disk, and a means for positioning the recording magnetic head relative to the rotated magnetic disk, wherein the recording magnetic head comprises a first magnetic pole on the upstream side, and a second magnetic pole on the downstream side with respect to the rotating direction of the magnetic disk, the first and second magnetic poles have faced sides, and the second magnetic pole is so shaped that, at a position where the skew angle is maximum, the width of an overlapped area of the projection of the second magnetic pole onto the surface of the magnetic disk and the track width of the magnetic disk is not more than 10% of the track width. Further, the width of the overlapped area is preferably not more than 5% of the track width.

An important point in the above modes is that the length of the overlapped area of the projection of the magnetic pole onto the surface of the magnetic disk and the track width of the magnetic disk as measured along the track width direction is not more than 10% of the track width. Further, the width of the overlapped area is preferably not more than 5% of the track width.

Naturally, as mentioned above, absence of the overlapped area of the projection of the magnetic pole onto the surface of the magnetic disk and the track width of the magnetic disk is the most excellent in view of thermal decay.

Next, an information recording system in which thermal decay is not easily accelerated will be referred to. The method can suppress the acceleration of thermal decay attendant on appending of information onto a magnetic disk apparatus. Therefore, by using the method with the magnetic disk apparatus according to the present invention, the thermal decay at the time of recording on the magnetic disk apparatus can be suppressed, and the thermal decay on the magnetic disk apparatus attendant on repetition of recording can be effectively suppressed.

The method comprises storing modified or appended information in a sector different from a sector with data recorded therein, without overwriting on a part or entire body of the sector with data recorded therein, at the time of modifying or appending information by use of the magnetic disk apparatus.

DETAILED DESCRIPTION OF THE INVENTION

First, representative examples of constitution of a magnetic disk apparatus and a magnetic head according to the present application will be described.

Figure 3:
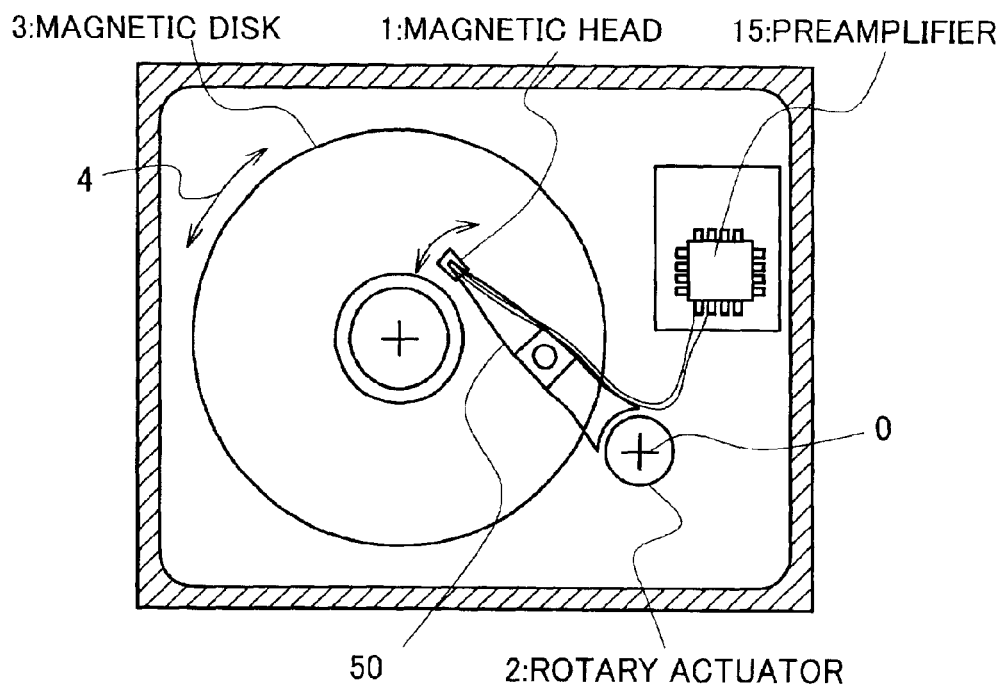
FIG. 3 is a plan view showing general constitution of a magnetic disk apparatus.
Figure 4:
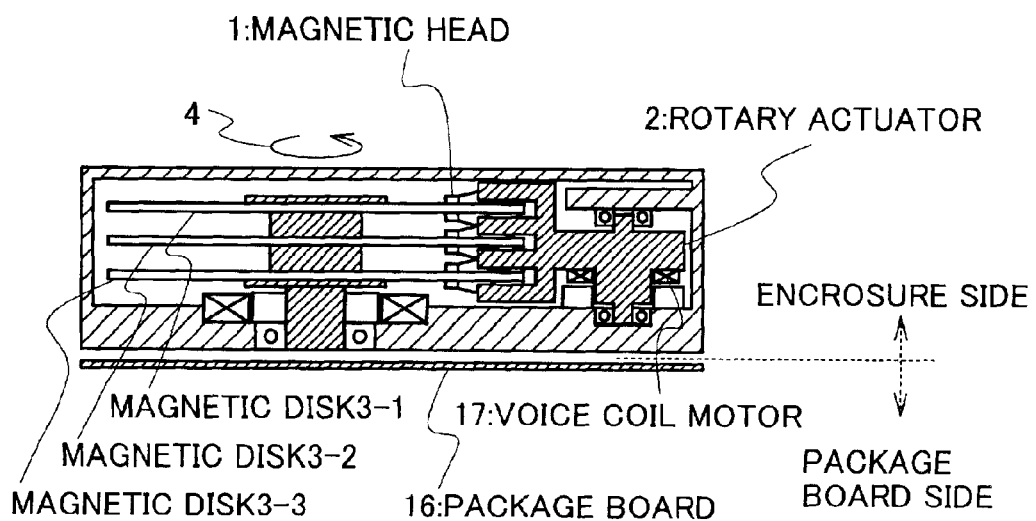
FIG. 4 is a sectional view showing general constitution of a magnetic disk apparatus.

FIG. 3 is a schematic diagram showing the plan view of the magnetic disk apparatus, and FIG. 4 is a schematic diagram showing a sectional view of the apparatus.

Figure 1:
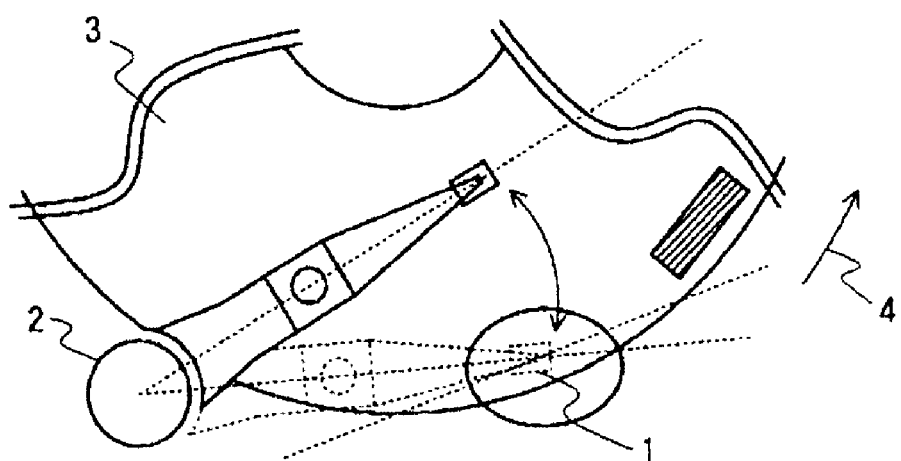
FIG. 1 is a partial general view of a magnetic disk apparatus.
Figure 2:
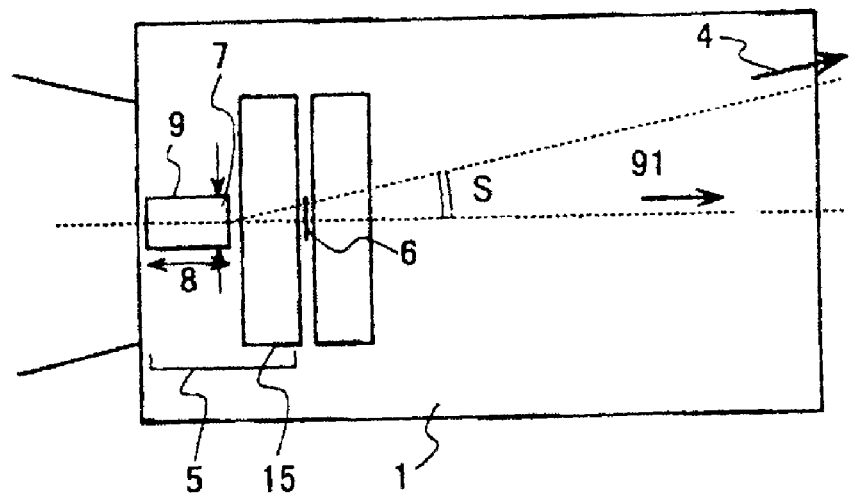
FIG. 2 is an enlarged plan view of a magnetic head portion.

The magnetic disk and the relationship between the magnetic disk and a rotary actuator are basically the same as those shown in FIG. 1 and FIG. 2.

This example of magnetic disk apparatus comprises a magnetic disk 3, and a magnetic head 1 for carrying out recording and/or reproduction on the magnetic recording medium. The magnetic head 1 is positioned and mounted through the rotary actuator 2 and a suspension arm 50. The rotary actuator 2 performs rotational motion with a support point O as a center. The example shown in FIG. 1 is an example in which a recording portion and a reproducing portion are mounted on one magnetic head. An inductive type head is used for the recording portion, and, for example, an MR head or the like is used for the reproducing portion. Ordinarily, the recording portion and the reproducing portion are provided as a laminate.

As the magnetic recording medium in the case of longitudinal magnetic recording system, there are used, for example, cobalt-chromium based alloys such as cobalt-chromium alloys, cobalt-platinum alloys, cobalt-chromium-tantalum alloys, cobalt-chromium-platinum alloys, cobalt-chromium-tantalum-platinum alloys or samarium-cobalt based alloys. As the recording medium in the case of perpendicular magnetic recording, there are used cobalt-chromium based alloys, terbium-iron-cobalt alloys and the like.

A signal processing system is chiefly shown in FIG. 4. An electric signal sent to the magnetic head 1 through a preamplifier 15 is converted into a magnetic information and recorded in the magnetic recording medium mounted on a rotated magnetic disk 3 by use of the magnetic head 1. At the time of-reproduction, conversely, magnetic information recorded in the magnetic recording medium is converted into an electric signal by the magnetic head 1, and the converted information is transmitted to the preamplifier 15. The recording or reproduced signal is sent through the preamplifier 15 to a package board 16 on which a signal processing circuit and a controller are mounted. Positioning of the magnetic head 1 to a target track is carried out by the rotary actuator 2 driven by a voice coil motor 17. In FIG. 3, the upper side of the broken line is the enclosure side, and the lower side is the package board side. In the example shown, the magnetic disk 3 includes a first disk (3-1), a second disk (3-2) and a third disk (3—3). Symbol 4 in FIG. 3 and FIG. 4 denotes the rotating direction (circumferential direction) of the magnetic disk.

Figure 5:
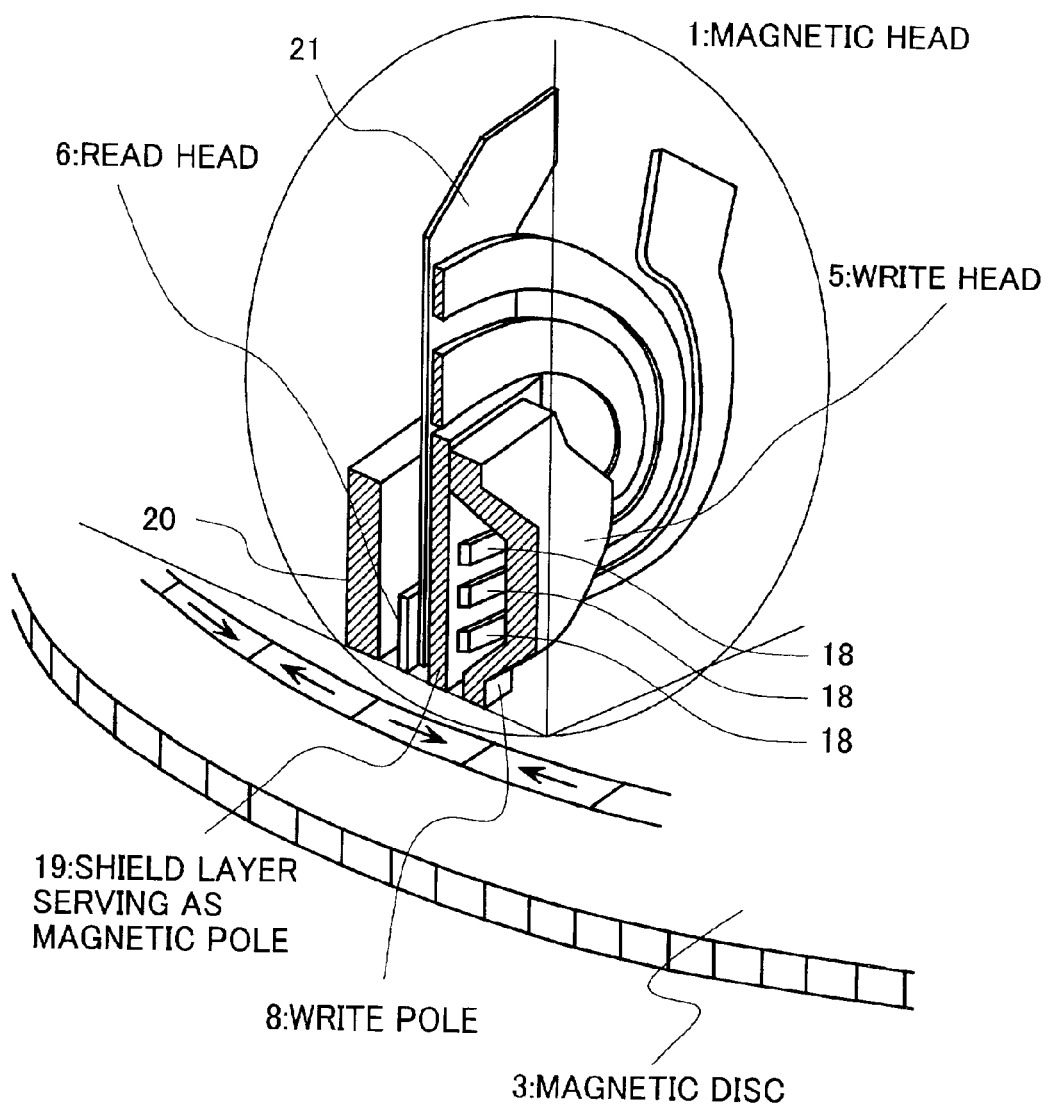
FIG. 5 is a perspective view of a recording/reproducing portion.
Figure 6A:
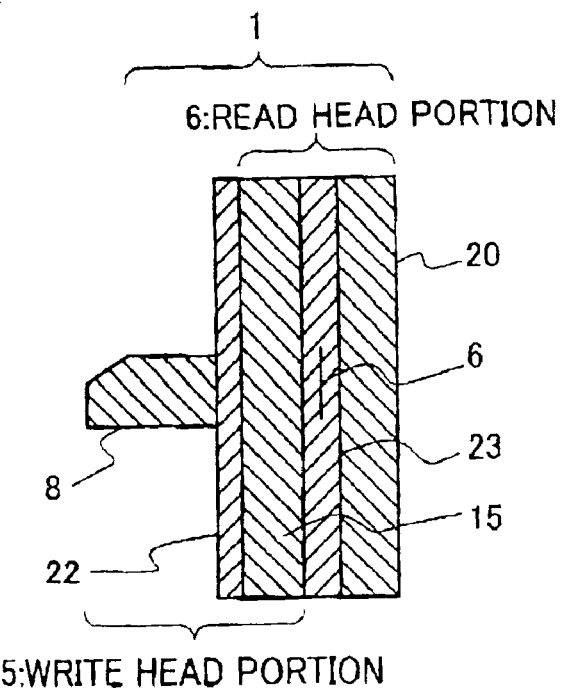
FIG. 6A is a bottom view as viewed from an air bearing surface of the recording/reproducing portion of a magnetic head.
Figure 6B:
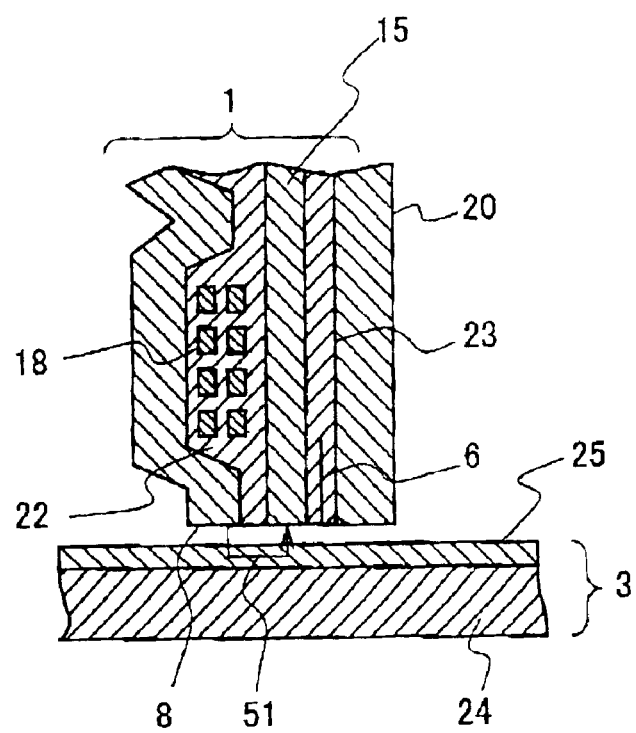
FIG. 6B is a vertical sectional view of a recording/reproducing portion of a magnetic head.

FIG. 5 is an enlarged view of an information recording/reproducing portion, FIG. 6(A) is a bottom view as viewed from an air bearing surface of the magnetic head, and FIG. 6(B) is a vertical sectional view of the magnetic head. Referring to the figures, concrete structure of the example of magnetic head will be described. As mentioned above, the magnetic head 1 comprises as one body a recording head 5 having only a recording function, and a reproducing head 6 having only a reproducing function.

As shown in FIG. 5, the recording head 5 comprises a recording magnetic pole 8 and an upper shield film 19, with a coil 18 therebetween. The upper shield film 19 functions also as a first magnetic pole. Naturally, the shield and the first magnetic pole may be provided as separate bodies.

By generating an alternating recording current in the coil 18, an alternating magnetic field is generated between the write pole 8 and the upper shield film 19, whereby magnetic information is recorded on the magnetic recording medium. In FIG. 6(B), the magnetic field 51 is shown schematically.

The reproducing head 6 is sandwiched between the upper shield 19 and a lower shield film 20, whereby leakage flux from the neighborhood is shielded, and only the information directly beneath the target position can be reproduced easily. A layer 23 is the shield gap (FIG. 6(A) and FIG. 6(B)). The form of this example is now widely used for magnetic heads.

An insulation film, for example, an alumina layer 22 is provided between a first magnetic pole (functioning also as upper shield) 19 and a second magnetic pole (recording pole) 8. The first magnetic pole (upper shield) 19, the insulation film 22, and the second magnetic pole coil (recording pole) 8 are laminated, and one side of the laminate constitutes an air bearing surface. As shown in FIG. 6(B), the magnetic head 1 is faced to the magnetic disk 3. Therefore, the portion of the insulation film 22 constitutes a write gap. The magnetic disk 3 comprises a recording medium layer 25 laminated on a substrate 24.

Although the present invention is naturally useful for magnetic disk apparatuses in general, it is particularly useful for a magnetic disk apparatus designed for a high record density of not less than 10 Gbit/in$^2$. Naturally, this is due to the fact that the track width is smaller than the conventional values. Generally, the pole thickness of the second magnetic pole may be several micrometers, and, usually, 3 to 4 $\mu$m. The thickness of the first magnetic pole also is about several micrometers. As the track width, a value of about 50 to 80% of the track pitch is adopted. Naturally, these specific values are determined according to required specifications of the magnetic disk.

Figure 9:
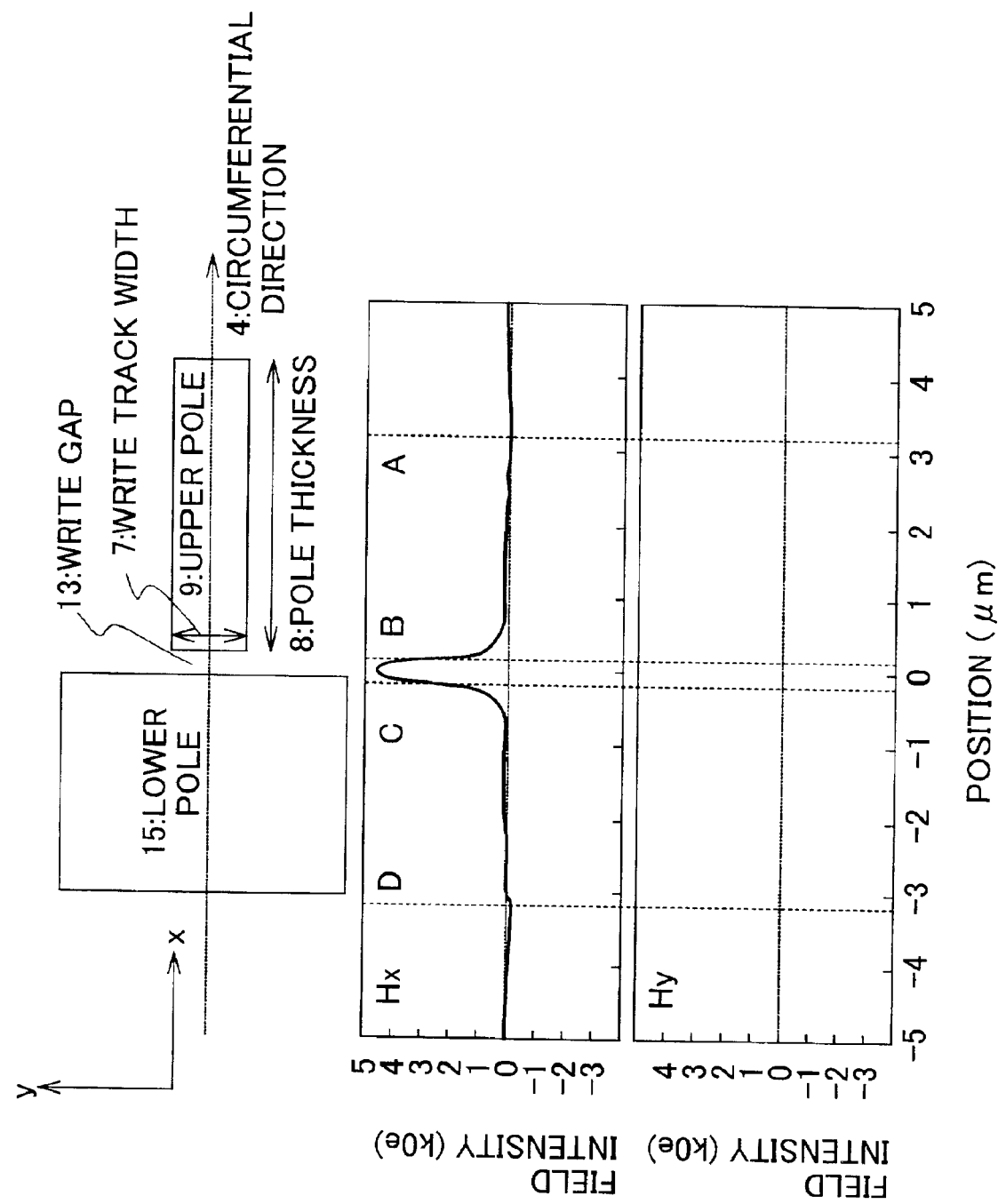
FIG. 9 is a diagram illustrating an example of magnetic field distribution at the center of track in a ring type magnetic head.
Figure 10:
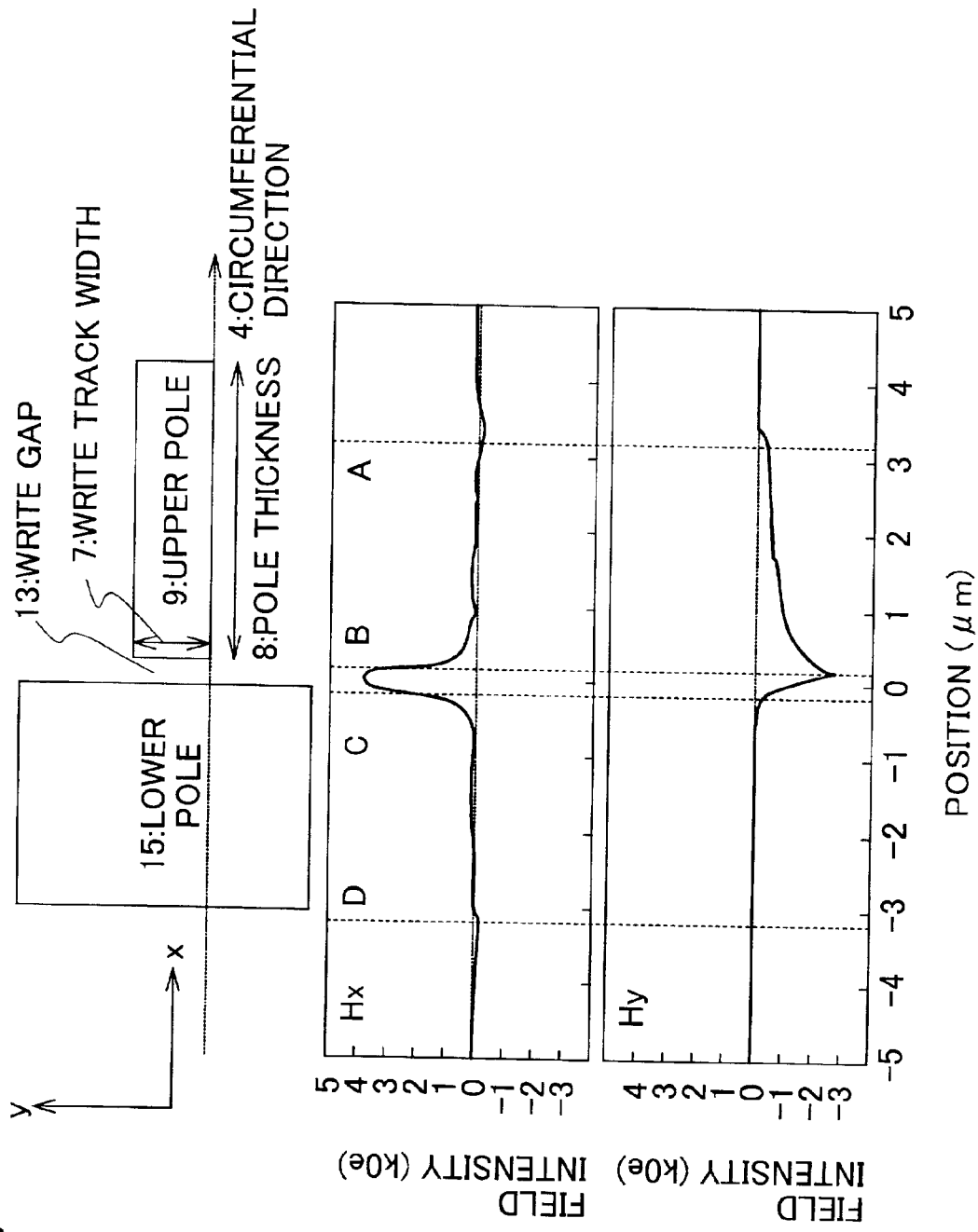
FIG. 10 is a diagram illustrating an example of magnetic field distribution at the track edge in the ring type magnetic head.

Next, the positional relationship of the magnetic head and recording tracks according to the invention will be described. FIG. 7, FIG. 8 and FIGS. 11 to 13 show the positional relationship of magnetic pole, recording track (data track) and adjacent tracks, as viewed from above. In addition, rotating direction (circumferential direction) and radial direction of the disk are also shown. In these figures, the same components or members are denoted by the same symbol; accordingly, individual descriptions may be omitted for each of the figures. Furthermore, FIG. 9 and FIG. 10 show examples of the recording magnetic field distribution at a central.

Figure 7:
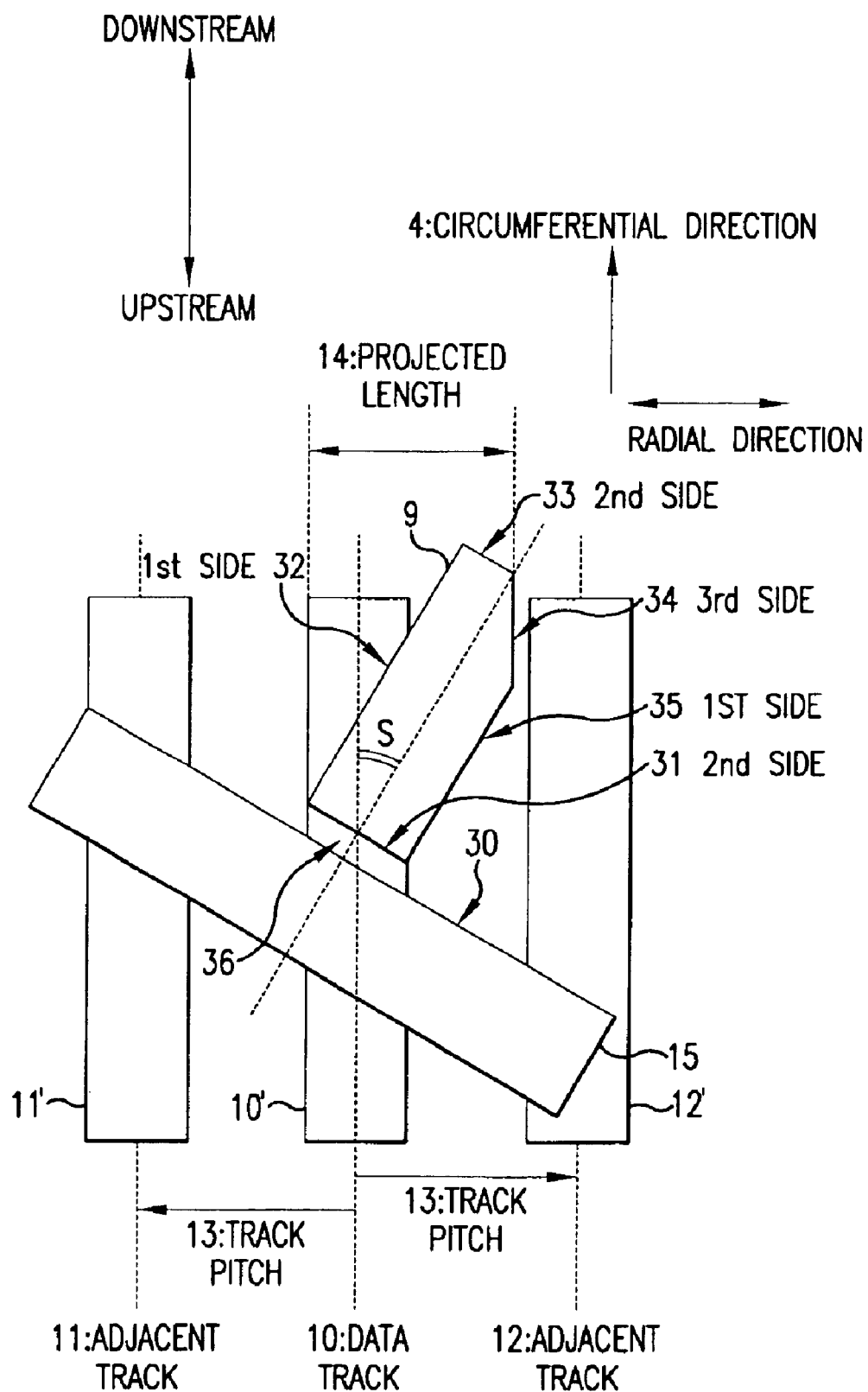
FIG. 7 is a plan view showing the positional relationship between a magnetic head and write tracks according to a first embodiment of the invention.

FIG. 7 shows the positioning relationship between a magnetic head and recording tracks according to a first embodiment of the invention. The figure shows the positional relationship, as viewed from above, of a data track 10 and adjacent tracks 11, 12 in the case where the skew angle is S. The track pitch is denoted by numeral 13. As the magnetic head, only a first (lower) pole 15 and a second (upper) pole 9 are illustrated. The areas of symbols 10', 11' and 12' in the figure are the areas of inversion of magnetization corresponding to recording tracks in the recording medium layer. This applies also in the similar figures.

In the present example, the projected length 14 of the upper pole 9 in the radial direction of disk is set to be not more than the track pitch. For this purpose, as shown in FIG. 7, a corner of the upper pole 9 is cut away so that the magnetic pole of the recording head does not overlap on the adjacent track portion.

More concrete description will be given below. The magnetic head for recording in this example comprises a first magnetic pole 15 disposed on the upstream side, and a second magnetic pole 9 disposed on downstream side with respect to the rotating direction of the magnetic disk. The first and second magnetic poles are faced to each other, and the portion between the faced sides 30, 31 of the first pole 15 and the second pole 9 constitutes a write gap 36. The second magnetic pole 9 has a third side 34 between a first side 35 intersecting the write gap 36 and one 33 of second sides (31, 33) faced to the write gap 36. Thus, the second pole 9 is so shaped that, at a position where the skew angle (S) is maximum, the length 14 of the projection of the second pole 9 onto the surface of the magnetic disk measured along the radial direction of the magnetic disk (namely, projected length) is not more than the track pitch 13 of the magnetic disk.

According to this arrangement, acceleration of thermal decay due to head field does not occur. To ensure that, at a position where the skew angle is maximum, the length of the projection of the magnetic pole onto the surface of the magnetic disk as measured along the radial direction of the magnetic disk is not more than the track pitch of the magnetic disk, a corner of the upper pole 16 is cut away, and the degree of cutting away is set in consideration of the field intensity required for recording.

In this example, the third side 34 is provided on the side of the magnetic head farther from the write gap.

Naturally, the present invention can be applied to various recording heads and magnetic disk apparatuses other than the illustrated here.

Figure 15:
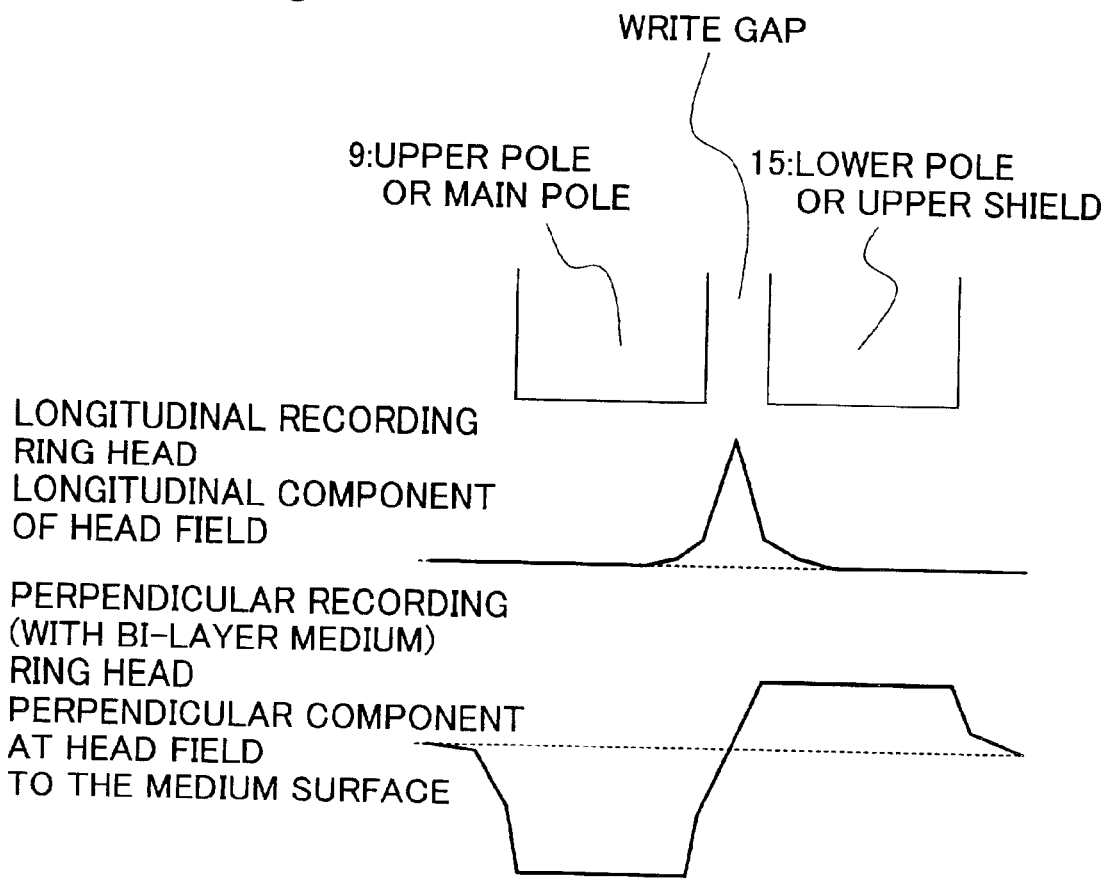
FIG. 15 is a diagram showing an example of magnetic field distribution in the case of using a longitudinal magnetic recording medium with a ring type magnetic head in the case of using a bi-layer perpendicular magnetic recording medium with a ring type magnetic head.

The ring type magnetic head can be used for both longitudinal magnetic recording and perpendicular magnetic recording, and spacing of the write gap and other characteristics are selected according to the differences in the recording systems. A comparatively narrower write gap is used for longitudinal magnetic recording, and a comparatively wider write gap is used for perpendicular magnetic recording. In the perpendicular magnetic recording, the perpendicular component of the magnetic flux to the recording medium surface is utilized. Therefore, designing of the magnetic head, particularly the write gap, is so conducted that the perpendicular component of the head field is principally generated on the surface of the recording medium. On the other hand, in the longitudinal magnetic recording, the in-plane component of the magnetic flux relative to the recording medium surface is utilized. Therefore, designing of the magnetic head, particularly the write gap, is so conducted that the in-plane component of the head field is principally generated on the surface of the recording medium. Accordingly, the magnetic heads according to the invention particularly suited to both recording systems are designed differently depending on the system. As shown in FIG. 15, a large longitudinal component of head field is present at the write gap portion in the case of longitudinal magnetic recording, whereas a large perpendicular component of head field is present throughout the magnetic pole in the case of perpendicular magnetic recording. Therefore, finally determined recorded state on the medium is located at the write gap portion in the case of longitudinal magnetic recording, whereas it is located at an end portion on the trailing side of the upper pole or main pole in the case of perpendicular magnetic recording.

Figure 12:
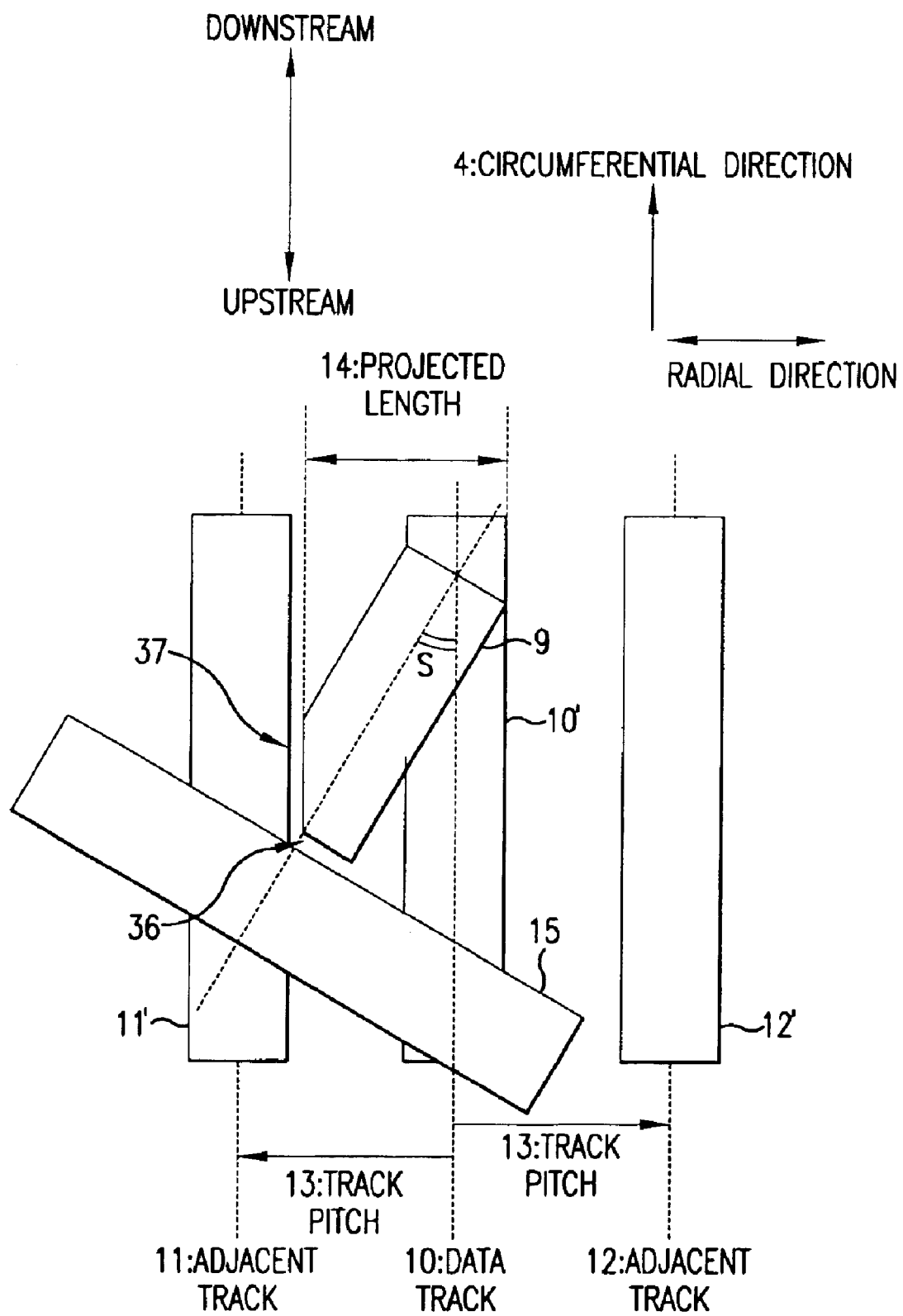
FIG. 12 is a plan view showing the positional relationship between a magnetic head and write tracks according to a third embodiment of the invention.

The characteristic feature pertaining to the gist of the invention is that, at a radial position where the skew angle is maximum, the length of the projection of the second pole onto the surface of the magnetic disk measured along the radial direction of the magnetic disk is not more than the track pitch of the magnetic recording metidum, and an important point or basic portion in realizing the characteristic feature in view of the above-described background is as follows. The portion to be paid attention to is a portion of the second pole farther from the write gap in the case of longitudinal magnetic recording, and a portion of the second pole nearer to the write gap in the case of perpendicular magnetic recording. From this point of view, FIG. 7 shows an embodiment particularly suitable for longitudinal magnetic recording, while FIG. 12 shows an embodiment particularly suitable for perpendicular magnetic recording.

Next, the effects of the present invention will be described.

Figure 8:
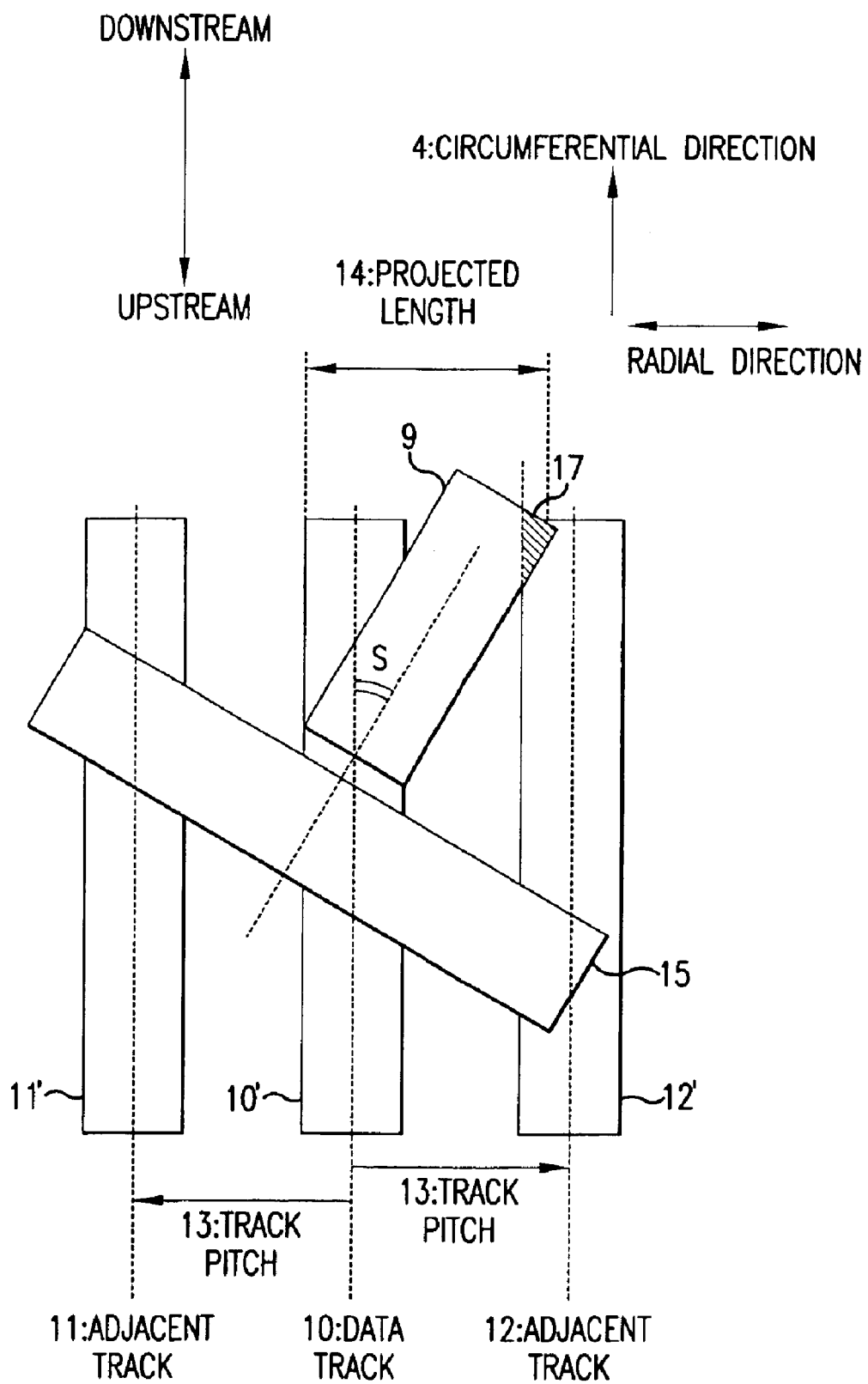
FIG. 8 is a plan view showing the positional relationship between a magnetic head and write tracks illustrating the problem in the prior art.

FIG. 8 is similar to FIG. 7 but differs from FIG. 7 in that the thought of the present invention is not applied to the upper pole 9. In this example, the projection of the second pole on the track surface overlaps on the adjacent track adjacent to the data track. Namely, where the pole thickness of the recording head is large, a portion of a tip of the write pole 9 has an overlap 17 on the position of the adjacent track 12 when the skew angle is large. For example, in the case of a rectangular write pole where the track pitch 13 is 1.3 micrometers, the write track width 7 is 1 micrometers and the pole thickness is 3 micrometers, a portion of the upper pole 9 overlaps on the position of the adjacent track 12 in an area where the skew angle is not less than 5.8 degrees.

Calculation results of distribution of write field generated from a ring type recording head are shown in FIGS. 9 and 10. FIG. 9 and FIG. 10 shows calculation results of write field distribution at a track center portion and a track edge, respectively. Here, x-axis is the circumferential direction 4 of the magnetic disk, and y-axis is the track width direction. Besides, x-component and y-component of write field are defined as Hx and Hy, respectively. In each of FIGS. 9 and 10, layout of lower pole, write gap and upper pole is shown at the upper portion, the distribution of magnetic field (Hx) in x-direction is shown in the intermediate graph, and the distribution of magnetic field (Hy) in y-direction is shown in the lower graph.

As seen from FIG. 9, at the track center, Hx is maximum at the position directly beneath the gap 13, and has an intensity distribution along the x-axis direction; the intensity decreases rapidly as the distance from the gap increases. The value of Hy is substantially 0 at any position. As seen from FIG. 10, at the track edge also, Hy is maximum at the position directly beneath the gap 13, and decreases rapidly as the distance from the gap increases. On the other hand, as contrasted to the case of the track center, Hy gradually trails and has a value of about several hundred oersteds until the tip portion of the upper pole is reached. As a result, in the area where the skew angle is large, a magnetic field at the time of recording information is applied also to the data previously recorded in the adjacent track. For example, at the track end portion, there is a magnetic field of 230 Oe at the end point A of the upper pole. Where one half of the upper pole overlaps on the adjacent track, it is seen from FIG. 10 that the magnetic field at the point of (A+B)/2, namely a field of 810 Oe at maximum is applied to the adjacent track. Where ⅓ of the upper pole overlaps on the adjacent track, the magnetic field at the point of (2A+B)/3 in FIG. 10, namely a field of 620 Oe at maximum is applied to the adjacent track.

In magnetic disks, the phenomenon of relaxation of recorded state, and a reduction of reproduction amplitude with time, under the effect of the phenomenon of thermal relaxation of recorded data (hereinafter referred to as thermal decay) has been reported, as mentioned above.

This is due to change of the recorded state by thermal energy at an ambient temperature for a recording medium. The presence of an external field gives energy to individual crystal grains, like heat, and therefore accelerates the thermal decay.

Magnetization recorded on a magnetic disk suffers thermal relaxation, and the remnant magnetization decreases with time. It has been described that thermal relaxation is accelerated by the presence of an externally applied magnetic field. A simulation of magnetic recording has been done by use of the Landau-Lifschitz equation, and applied field dependency of remnant magnetization after 10 years has been calculated. The results are shown in Table 1.

TABLE 1

| Effective field applied to adjacent tracks (Oe) | Theoretical value of remnant magnetization after 10 years (relative value) | Note |
|---|---|---|
| 0 | 0.97 | Upper pole does not overlap on adjacent track |
| 200 | 0.955 | |
| 220 | 0.95 | |
| 620 | 0.90 | ⅓ of upper pole overlaps on adjacent track |
| 810 | 0.86 | ½ of upper pole overlaps on adjacent track |

The magnetic field applied to the adjacent track is 230 Oe the end point A of the upper pole is in contact with the adjacent track, 620 Oe when ⅓ of the upper pole overlaps on the adjacent track, and 810 Oe when ½ of the upper pole overlaps on the adjacent track. In view of Table 1 showing the relative value of remnant magnetization after 10 years, the remnant magnetization is reduced to 0.86 when one half of the upper pole overlaps on the adjacent track, and is reduced to 0.90 when ⅓ of the upper pole overlaps on the adjacent track.

In order to prevent a floating magnetic field from being applied to the adjacent track at a radial position where the skew angle is maximum, it suffices that the projected length 14 of the upper pole in the radial direction of the disk as shown in FIG. 8 is not more than the track pitch 13. Therefore, when the end portion 17 of the upper pole is cut away as described above so that the magnetic pole of the recording head does not overlap on the adjacent track, acceleration of thermal decay by head field will not occur.

Figure 11:
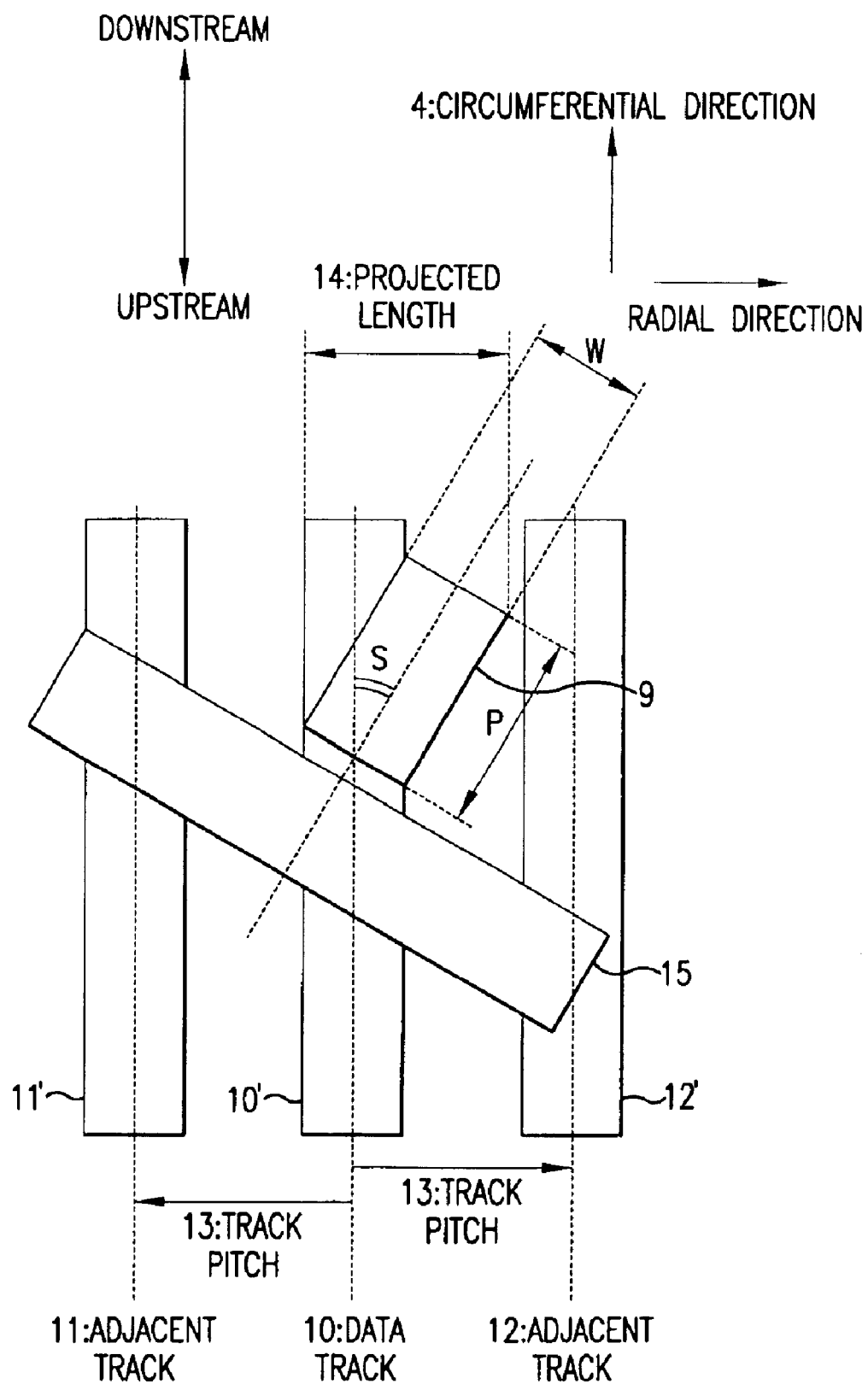
FIG. 11 is a plan view showing the positional relationship between a magnetic head and write tracks according to a second embodiment of the invention.

FIG. 11 shows a second embodiment of the present invention. This embodiment shows another example of preventing the projection 14 of the magnetic pole 9 of the recording head from overlapping on the adjacent track. For ensuring that the projected length of the upper pole is not more than the track pitch, in the same manner as in the first embodiment, it suffices that the shape of the ordinary rectangular upper pole satisfies the following formula:

$$TP \geq P \times \sin(S) + W \times \cos(S)$$

where TP is the track pitch, P is the pole thickness of the upper pole, W is the track width of the recording head, and S is the skew angle of the magnetic head.

This example differs from the example of FIG. 7, and is not an example in which the shape of the second pole is defined by use of a third side. Namely, in this example, the shape of the second pole is a tetrangle and the pole thickness thereof is controlled. The same idea may be used also in the case of a single pole head.

FIG. 12 shows a third embodiment of the present invention. In the same manner as in the first embodiment, for ensuring that the projected length 14 of the upper pole 9 is not more than the track pitch 13, an end portion of the upper pole is cut away. While in the first embodiment the end portion of the upper pole 9 on the downstream side with respect to the rotating direction of the disk was cut away, in this embodiment an end portion on the side of the gap 36 is cut away. In this case, the side 37 is the third side.

As has been described above, at the time of recording a magnetization inversion by a magnetic head on a rotated disk, the position at which the magnetization inversion is finally determined is substantially directly beneath the gap in the longitudinal magnetic recording system, but it is near the faced line of the upper pole farther from the gap in the perpendicular magnetic recording system. This embodiment can be applied to not only the longitudinal magnetic recording system but also the perpendicular magnetic recording system.

Figure 13:
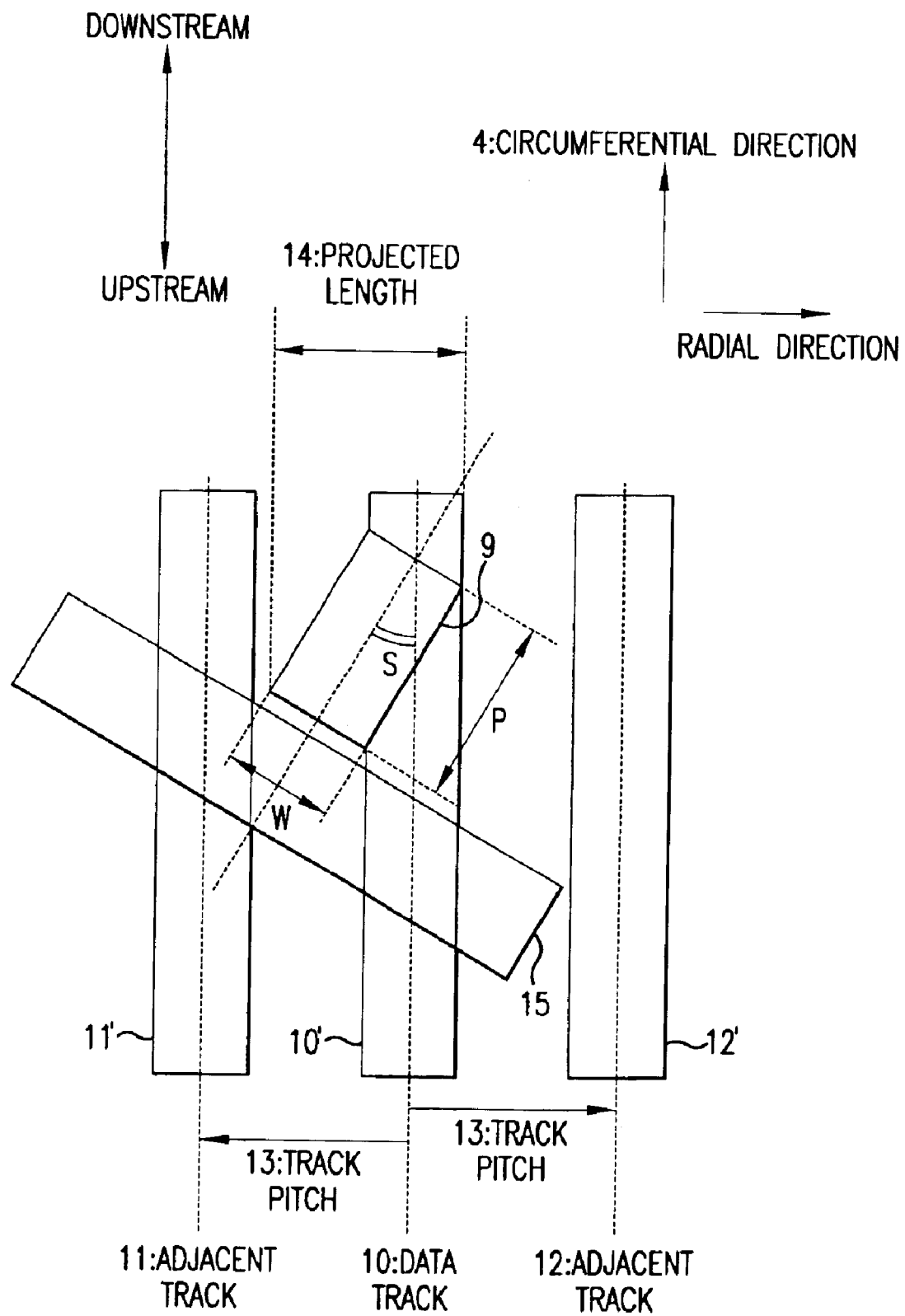
FIG. 13 is a plan view showing the positional relationship between a magnetic head and write tracks according to a fourth embodiment of the invention.

FIG. 13 shows a fourth embodiment of the present invention. This embodiment differs from the second embodiment shown in FIG. 11 only in that the recording point of magnetization inversion is shifted.

This embodiment can be applied to not only the longitudinal magnetic recording system but also the perpendicular magnetic recording system.

Now, perpendicular magnetic recording, particularly an example of perpendicular magnetic recording with a bi-layer medium will be described.

This case requires more the present invention, and this example is an example for which the effects of the present invention are displayed more effectively.

Figure 14:
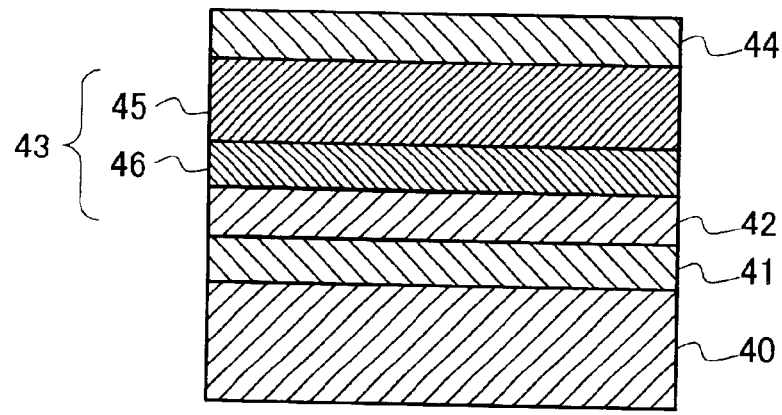
FIG. 14 is a sectional view showing an example of stack of a magnetic recording medium.

Magnetic recording with a bi-layer medium means that a recording medium is constituted of two layers of magnetic material. As shown in FIG. 14, a magnetic disk generally comprises on a disk substrate 40 a ground layer 41, a chromium alloy layer 42, a magnetic recording layer 43 and an upper protective film 44. The constitution of the laminate may be improved or modified variously, but the basic constitution is as described above. For example, the chromium alloy layer 42 may be omitted. Examples of the material for the magnetic recording layer has been described above, and the bi-layer medium may comprise, for example, a soft magnetic film 46 or the like beneath a first magnetic recording layer 45. Since this technology itself is well known, detailed description thereof is omitted.

FIG. 15 shows an example of distribution of recording field under the recording gap and magnetic poles in a ring head. Layout of the recording gap and magnetic poles is shown in an upper portion of the figure, longitudinal component of head field at the time of recording on a longitudinal magnetic recording medium is shown in an intermediate portion of the figure, and distribution of perpendicular field component at the time of recording on a bi-layer perpendicular magnetic recording medium is shown in a lower portion of the figure. In this example, the distribution of longitudinal field component at the time of recording on the longitudinal magnetic recording medium is the same as the examples described above. On the other hand, the distribution of perpendicular field component at the time of recording on the bi-layer perpendicular magnetic recording medium is different from the above examples in that the area with a large perpendicular field component extends below the magnetic poles.

On the other hand, in the case of a general magnetic head, for example, the example of FIG. 10, the distribution of Hy has a maximum value at an end portion of the write gap, and the perpendicular field component gradually decreases as the end of the magnetic pole is approached. At the end portion of the magnetic pole, no large component exists.

Due to such a difference in magnetic field distribution, in this example of the bi-layer medium there is a stricter requirement as to the setting of distance between the recording pole and the adjacent track. Namely, in the perpendicular magnetic recording on a bi-layer medium, the influence of the magnetic pole on the adjacent track is greater than that in ordinary cases. Even a small degree of overlap of the magnetic pole on the adjacent track would causes great acceleration of thermal decay. Accordingly, the effect of applying the present invention is more conspicuous in such an example of bi-layer medium.

Next, an example of the method of producing the magnetic head according to the invention will be described.

FIGS. 16(A) to 19(B) are plan views illustrating the major points of the method of producing the magnetic head according to the invention. In these figures, like the above examples, an example of a ring head is treated, and only the projections of a first magnetic pole 15 and a second magnetic pole 9 onto the disk surface are shown.

The important point of the method of producing a magnetic disk according to the invention relates to processing of the plan view shape of the magnetic pole, and only the steps of this process are illustrated.

Ordinarily, as shown in FIG. 6, from a lower shield film 20 to a recording magnetic pole 8 are sequentially provided on a non-magnetic substrate. After the recording pole 8 is formed as a film, an end face on the rear end side of the recording pole 8 is flattened so as to be parallel to a reproducing head or the like. The flattening is carried out by lapping, FIB (Focused Ion Beam) processing or the like. According to the present invention, an ordinary rectangular upper pole is formed by such conventional method, and thereafter a desired portion the projection of which overlaps on the adjacent track is removed. For the removal, there may be used FIB, sputtering, ion milling and the like. The working conditions for this process may be as in the usual cases for the materials related.

FIGS. 16(A), 16(B), 17(A) and 17(B) show an example of removing a corner portion of the second pole farther from the write gap, whereas FIGS. 18(A), 18(B), 19(A) and 19(B) show an example of removing a corner portion of the second pole nearer to the write gap. Numerals 34 and 37 denote a third side.

Figure 16A:
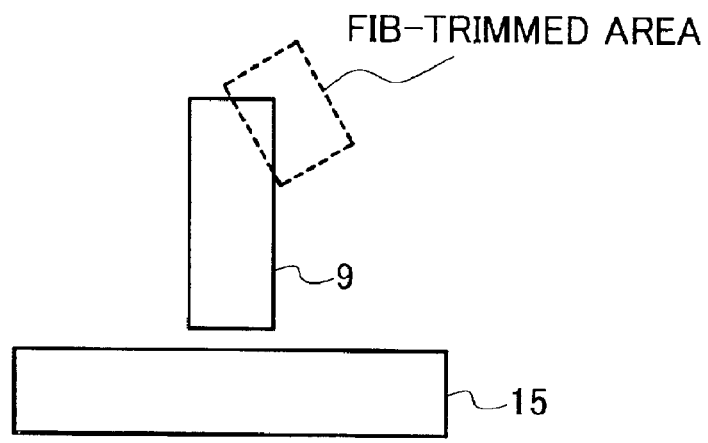
FIG. 16A is a plan view of a magnetic pole before machining formed by a prior-art method.
Figure 16B:
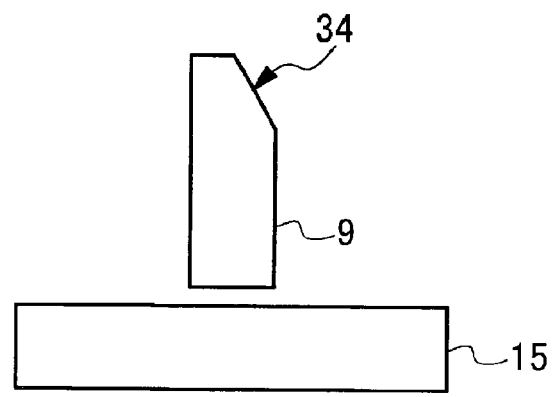
FIG. 16B is a plan view of an example of a magnetic pole after machining.

FIG. 16(A) is a plan view of a magnetic pole formed by a prior-art method. The box-shaped area shown in FIG. 16(A) is trimmed by FIB from the head floating side, to produce the shape shown FIG. 16(B).

Figure 17A:
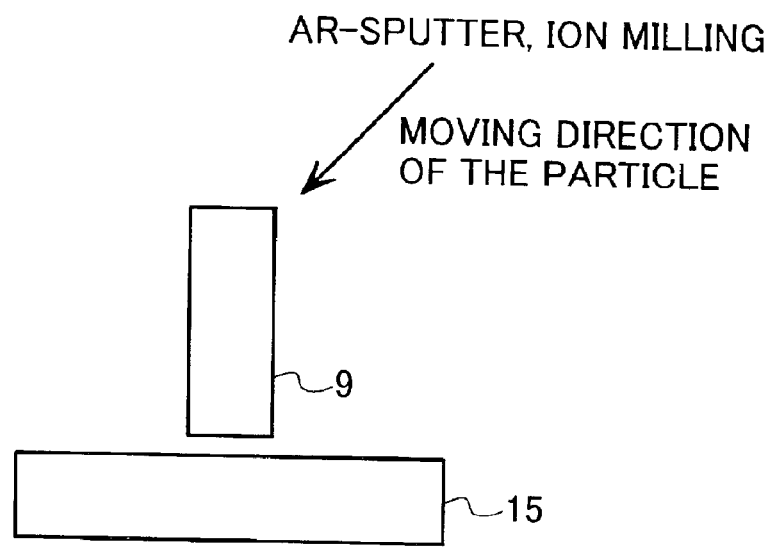
FIG. 17A is a plan view of a magnetic pole before machining formed by a prior-art method.
Figure 17B:
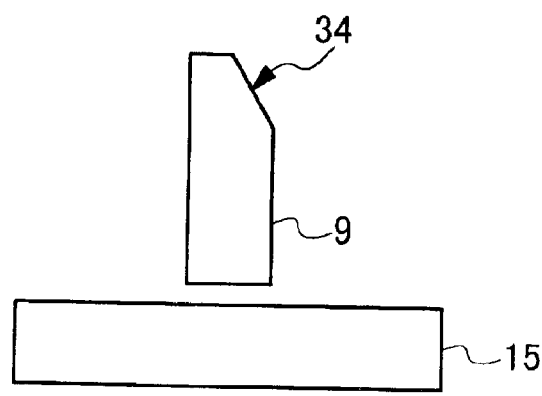
FIG. 17B is a plan view of an example of a magnetic pole after machining.

FIGS. 17(A) and 17(B) show a second method of producing the magnetic head used in the first embodiment of the invention. FIG. 17(A) is a plan view of a magnetic pole formed by a prior-art method. As shown in FIG. 17(A), Ar sputtering or ion milling is carried out in a skew direction to produce the shape shown in FIG. 17(B). The sputtering or ion milling is preferably carried out in a skew direction of less than 90 degrees with respect to the track width direction.

Figure 18A:
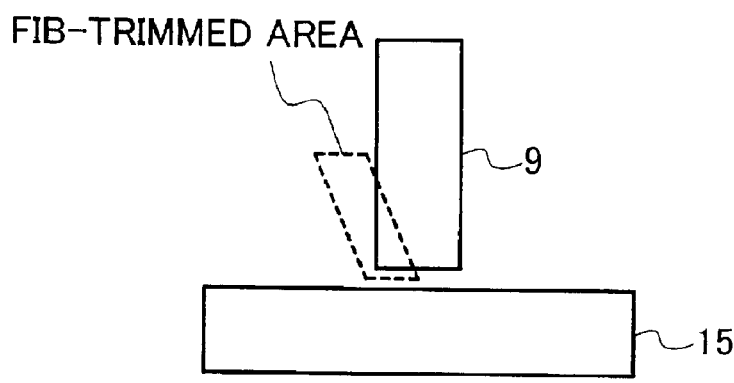
FIG. 18A is a plan view of a magnetic pole before machining formed by a prior-art method.
Figure 18B:
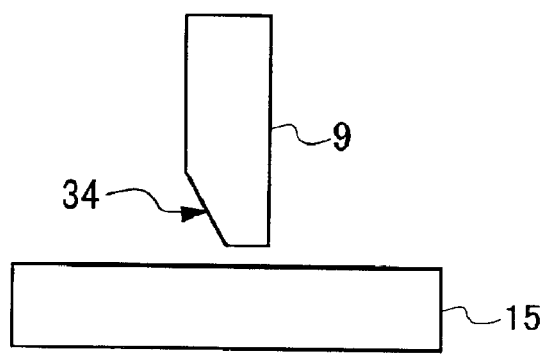
FIG. 18B is a plan view of an example of a magnetic pole after machining.

FIGS. 18(A) and 18(B) show another method of producing the magnetic head for use in the third embodiment of the invention. FIG. 18(A) is a plan view of a magnetic pole formed by a prior-art method. The box-shaped area shown in FIG. 18(A) is trimmed by FIB from the head floating side, to produce the shape shown in FIG. 18(B).

Figure 19A:
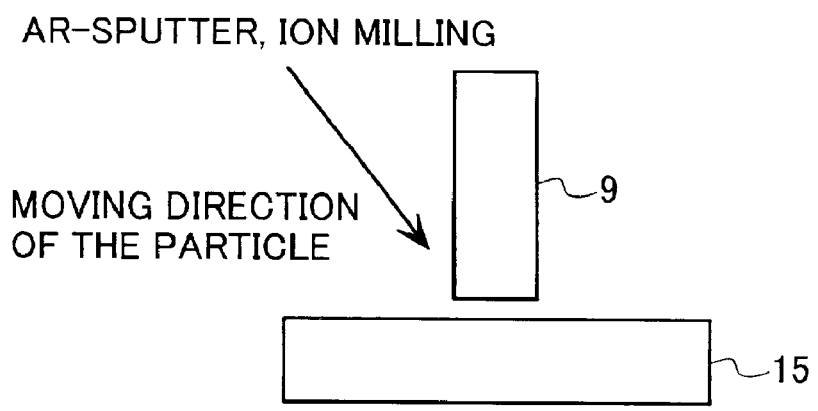
FIG. 19A is a plan view of a magnetic pole before machining formed by a prior-art method.
Figure 19B:
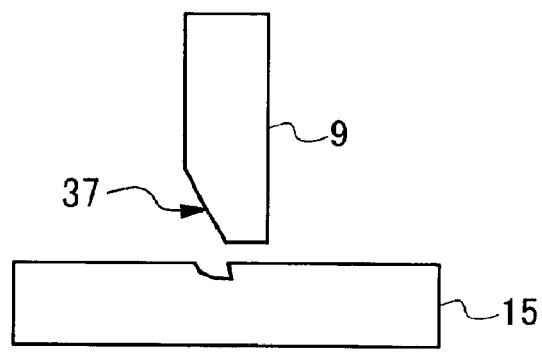
FIG. 19B is a plan view of an example of a magnetic pole after machining.

FIGS. 19(A) and 19(B) show a further method of producing the magnetic head for use in the third embodiment of the invention. FIG. 19(A) is a plan view of a magnetic pole formed by a prior-art method. As shown in FIG. 19(A), Ar sputtering or ion milling is carried out in a skew direction to produce the shape shown in FIG. 19(B). The sputtering or ion milling is preferably carried out in a skew direction of less than 90 degrees with respect to the track width direction.

In this method, the lower pole may be a little machined away, depending on the sputtering or milling conditions. In this method, therefore, it is preferable to control, for example, power condition so that the lower pole would not greatly machined away.

Figure 21:
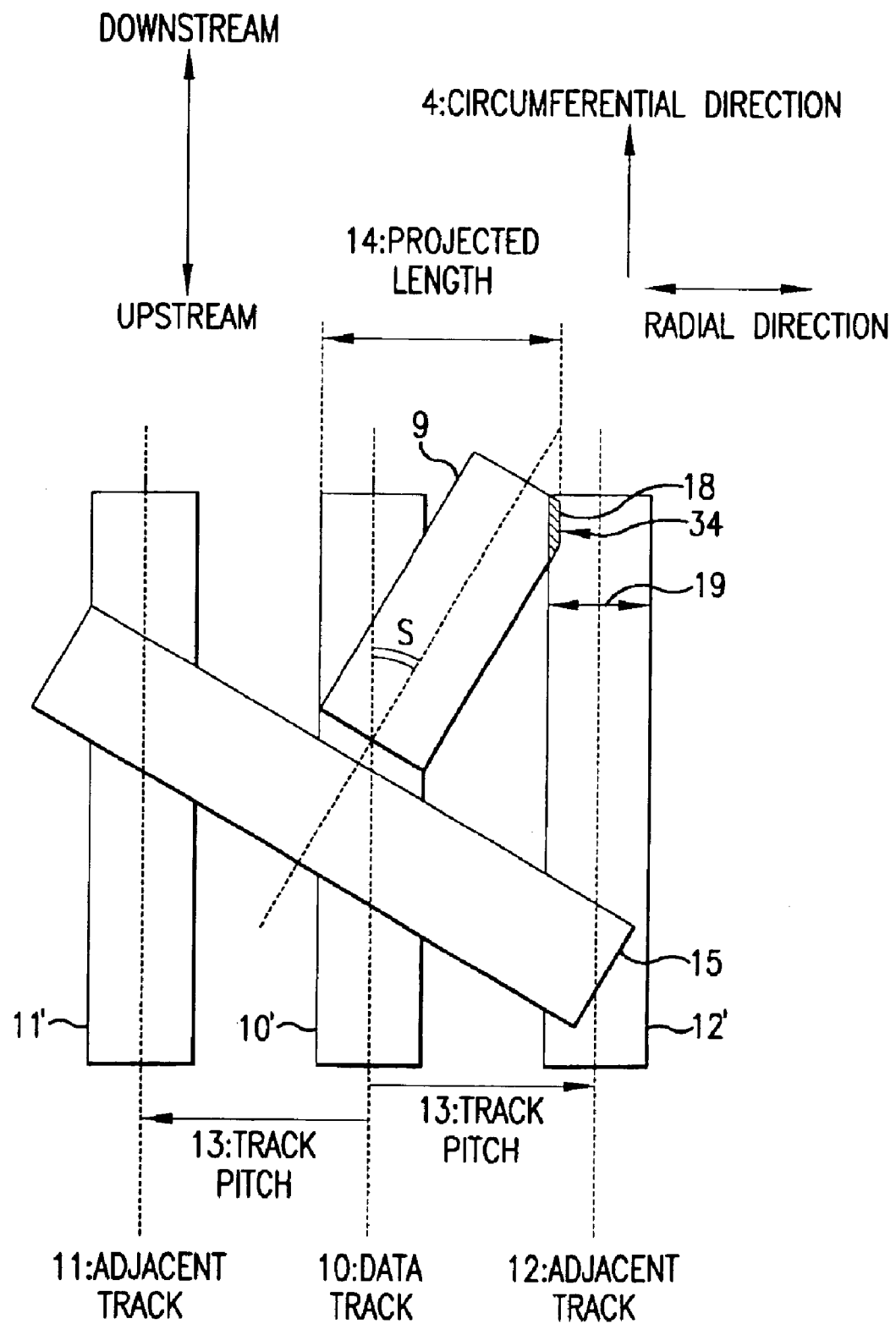
FIG. 21 is a plan view showing the positional relationship between a magnetic head and write tracks according to a further embodiment of the invention.

Next, another example of the present application will be described. FIG. 21, like similar figures described above, shows the positional relationship of magnetic pole, data track and adjacent tracks in this example, as viewed from above.

The second magnetic pole is so shaped that, at a position where the skew angle is maximum, the overlapped portion 18 of the projection of the second pole 9 onto the surface of the magnetic disk and the track width 12' of the magnetic disk is not more than 10% of the track width 12'. More preferably, the overlapped portion is in excess of 0% but not more than 10% of the track width, whereby the magnetic head obtained shows more excellent characteristics than the conventional magnetic heads. In this example, the third side 34 is used, and the projection of the second pole 9 onto the track surface overlaps on the track 12 adjacent to the recording track (data track) 10.

The invention can be accomplished with single-pole magnetic heads or ring heads, irrespectively of the shapes of magnetic poles, by ensuring that the overlapped area of the projection of the magnetic pole onto the surface of the magnetic disk and the track width of the magnetic disk is set within a predetermined range. While these points of the present invention will not be illustrated more, the present invention can naturally be embodied with the magnetic poles having the shapes shown in FIGS. 7, 11, 12 and 13. Such magnetic poles can be produced in the same manner as the above-mentioned methods.

Next, a method of modifying or appending information on a magnetic disk apparatus will be described.

Figure 20:
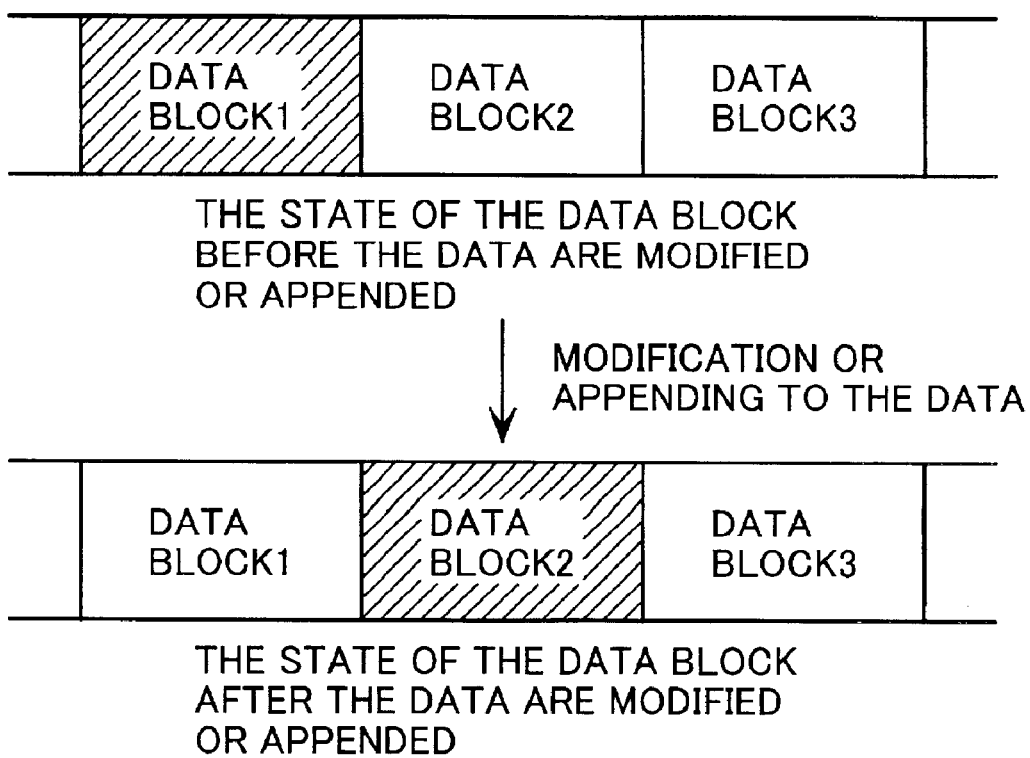
FIG. 20 is a diagram illustrating a data modifying/appending system for a magnetic disk apparatus according to the invention.

FIG. 20 shows a method of modifying or appending information on a magnetic disk apparatus according to the present invention. In an upper portion of FIG. 20, the recorded state before data are modified or appended is shown. The figure shows that the data are recorded on only a data block 1. When a composition is modified or appended on a word processor, if recording or reproduction for repeated overwriting is repeated only on the data block 1 in which data are previously recorded, only the same portions of the adjacent tracks are repeatedly affected by a floating field of recording. In order to alleviate such a situation, at the time of overwriting, the entire data in the data block requiring overwriting are recorded on a data block (for example, data block 2) other than the previous data block. As a result of this process, the situation in which the floating field at the time of recording is repeatedly applied to the adjacent track at each overwriting can be obviated, and acceleration of thermal decay can be suppressed.

The present invention provides a magnetic disk apparatus capable of securing a sufficiently stable recorded state even in magnetic recording with high recording density.

From a technical point of view, the present invention provides a magnetic head and a magnetic disk apparatus such that thermal relaxation of recorded data in the adjacent tracks is not accelerated even in an area where the skew angle is large.

What is claimed is:

1. A magnetic disk apparatus comprising a magnetic head formed by stacking thin films, a rotated magnetic disk, and a means for positioning said magnetic head relative to said rotated magnetic disk, wherein said magnetic head comprises a first magnetic pole and a recording magnetic pole, and, at a position on said magnetic disk where the angle S between the rotating direction of said magnetic disk and the film thickness direction of said recording magnetic pole is maximum, the length of the projection of said recording magnetic pole onto the magnetic disk surface as measured along the radial direction of said magnetic disk is not more than the track pitch of said magnetic disk, wherein the shape of said recording magnetic pole as viewed from a sliding surface of said magnetic disk comprises a first side, a second side faced to the first magnetic pole on the opposite side of the first magnetic pole, and a third side intersecting said first and second sides.

2. A magnetic disk apparatus as set forth in claim 1, wherein said third side is disposed on the opposite side faced to the first magnetic pole and wherein said magnetic disk apparatus is a longitudinal magnetic recording apparatus.

3. A magnetic disk apparatus as set forth in claim 1, wherein said third side is on the side faced to the first magnetic pole and wherein said magnetic disk apparatus is a perpendicular magnetic recording apparatus.

4. A magnetic disk apparatus comprising a magnetic head, and a rotated magnetic disk, wherein said magnetic head comprises a first magnetic pole and a recording magnetic pole, said first and recording magnetic poles have faced portions forming a recording gap therebetween, and the shape of projection of said recording magnetic pole onto said magnetic disk comprises a first side intersecting said faced portions, a second side faced to the first magnetic pole or on the opposite side of the first magnetic pole, and a third side intersecting said first and second sides, the length of the projection of said recording magnetic pole onto the magnetic disk surface as measured along the radial direction of said magnetic disk is not more than the track pitch of said magnetic disk.

5. A magnetic disk apparatus according to claim 4, wherein said magnetic head comprises a first magnetic pole and a recording magnetic pole, and, at a position on said magnetic disk where the angle S between the rotating direction of said magnetic disk and the film thickness direction of said recording magnetic pole is maximum, the length of an overlapped area of the projection of said second magnetic pole onto the magnetic disk surface and track width of said magnetic disk is not more than 5% of said track width, said overlapped area has a width with which the recording magnetic pole overlaps a track adjacent to a recording track.

6. A magnetic disk apparatus as, set forth in claim 4, wherein said third side is disposed on the opposite side facing the first magnetic pole and wherein said magnetic disk apparatus is a longitudinal magnetic recording apparatus.

7. A magnetic disk apparatus as set forth in claim 4, wherein said third side is disposed on the side facing the first magnetic pole and wherein said magnetic disk apparatus is a perpendicular magnetic recording apparatus.

8. A magnetic disk apparatus comprising a magnetic head having a magnetic pole formed by stacking thin films, a rotated magnetic disk, and a means for positioning said magnetic head relative to said magnetic disk, wherein, at a position on the recording disk where the angle S between the rotating direction of said magnetic disk and the thickness direction of said thin films constituting said magnetic pole is maximum, the sum of P×sin(S) and W×cos(S) is not more than the track pitch of said magnetic disk, where P is the film thickness of said magnetic pole and W is the width of said magnetic pole.

9. A magnetic disk apparatus as set forth in claim 8, wherein said magnetic pole comprises said first magnetic pole and a recording magnetic pole, and, at a position on said magnetic disk where the angle S between the rotating direction of said magnetic disk and the film thickness direction of said recording magnetic pole is maximum, the sum P×sin(S) and W×cos(S) is not more than the track pitch of said magnetic disk, where P is the film thickness of said recording magnetic pole and W is the width of said recording magnetic pole.

10. A magnetic disk apparatus as set forth in claim 8, wherein a third side is disposed on the opposite side facing the first magnetic pole and wherein said magnetic disk apparatus is a longitudinal magnetic recording apparatus.

11. A magnetic disk apparatus as set forth in claim 8, wherein a third side intersecting a first side and a second side is disposed on the side facing the first magnetic pole and wherein said magnetic disk apparatus is a perpendicular magnetic recording apparatus.

12. A magnetic disk apparatus comprising a magnetic head formed by stacking thin films, a rotated magnetic disk, and a means for positioning said magnetic head relative to said rotated magnetic disk, wherein said magnetic head comprises a first magnetic pole and a recording magnetic pole, and, at a position on said magnetic disk where the angle S between the rotating direction of said magnetic disk and the film thickness direction of said recording magnetic pole is maximum, the length of the projection of said recording magnetic pole onto the magnetic disk surface as measured along the radial direction of said magnetic disk is not more than the track pitch of said magnetic disk.

13. A magnetic disk apparatus as set forth claim 12, wherein a third side is disposed on an opposite side faced to the first magnetic pole, wherein said magnetic disk apparatus is a longitudinal magnetic recording apparatus.

14. A magnetic disk apparatus as set forth in claim 12, wherein a third side is disposed on a side faced to the first magnetic pole wherein said magnetic disk apparatus is a perpendicular magnetic recording apparatus.

\* \* \* \* \*